June 4, 1957   A. J. HORNFECK   2,794,971
MEASURING SYSTEM
Filed March 17, 1955   2 Sheets-Sheet 1

*INVENTOR.*
ANTHONY J. HORNFECK
BY
*ATTORNEY*

June 4, 1957 A. J. HORNFECK 2,794,971
MEASURING SYSTEM
Filed March 17, 1955 2 Sheets-Sheet 2

INVENTOR.
ANTHONY J. HORNFECK
BY
*Raymond W. Junkins*
ATTORNEY

United States Patent Office 2,794,971
Patented June 4, 1957

2,794,971
MEASURING SYSTEM

Anthony J. Hornfeck, South Euclid, Ohio, assignor to Bailey Meter Company, a corporation of Delaware Application March 17, 1955, Serial No. 494,955

2 Claims. (Cl. 340—187)

This invention relates to improvements in telemetric control systems which produce electrical effects in accordance with the value of a variable. The effect may be considered as a control means for maintaining a dependent variable in correspondence with a master or independent variable. The variables may be the same or different. One of the variables, for example the independent variable, may be rate of flow of a fluid, humidity, temperature, pressure, electromotive force, or the like, while another of the variables, for example the dependent variable, may be the position of a member. In other situations the independent variable may be the position of a member, and the dependent variable may be the rate of flow, humidity, temperature, pressure, electromotive force, or the like.

In specific embodiment of my invention, I consider the magnetic coupling between a primary and a secondary coil or coils. The coupling is varied in correspondence with one of the variables so that the voltages produced in a secondary circuit may correspond in magnitude to the magnitude of one of the variables. The secondary circuit supplies a bridge or balanceable electric network which has an adjustable portion to rebalance the bridge after it has been unbalanced by a change in the magnetic coupling between the primary and secondary windings. With the variables equal, or in predetermined relation, the ratio of the voltages across adjacent bridge legs are equal or balanced. Without correspondence between the variables, an unbalance voltage will appear across the bridge output conjugate with a phase depending upon the sense of departure of the independent variable from proper correspondence with the dependent variable. It is this phase of the output voltage which determines the direction of operation of suitable electromagnetic means which may be arranged to alter the value of one of the variables to maintain the same in proper correspondence with another of the variables.

For all ranges of movement to change the magnetic coupling between the primary and secondary coils, the structural embodiment of the present invention causes the secondary circuit to supply the bridge with a predetermined range of ratios of voltages for one pair of adjacent bridge legs. The second pair of adjacent bridge legs has a predetermined range of voltage ratios established by the movement of the adjustable portion of the bridge. The present invention may then be regarded as establishing a common range for both ranges of voltage ratios.

The general object of my invention is to standardize the ranges of the voltage ratios of balanceable networks of telemetric measuring systems.

Another object of my invention is to provide an impedance network for voltage ratio measuring electric networks which will establish uniformity between variable motions unbalancing the network and the ratio of voltages which are evidence of the network unbalance.

Another object of my invention is to provide movable core transformer-potentiometer telemetric systems with a resistance system wherein change of the value of one resistance of the system will provide for variable ranges of core movement and a fixed range of potentiometer movement.

Another object of my invention is to provide a resistance T network for a movable core transmitter which will provide a uniform ratio of secondary voltage outputs for variable ranges of core movement.

Figure 1:
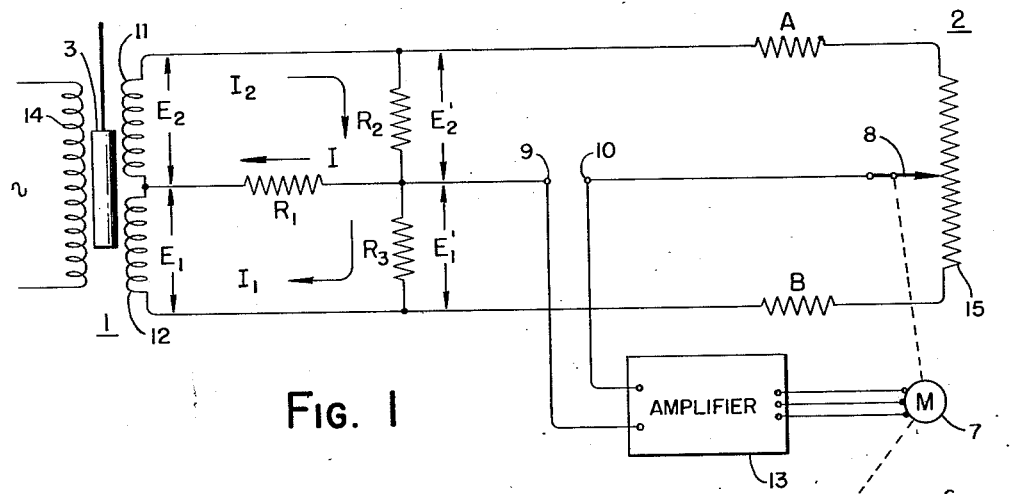
Fig. 1 illustrates my invention embodied in a coil-potentiometer balancing system.

The specific embodiment of Fig. 1 gives complete illustration to the structural arrangement of the resistance network in which the invention is embodied, combined in a movable core transformer-potentiometer balanceable network. This type of telemetering network has been disclosed in many patents of which my 2,406,221, issued August 20, 1946, is but one example.

A transmitting and receiving station are illustrated for telemetering from one point to another. The transmitting station is provided with magnetically coupled primary and secondary coils or windings comprising a movable core transformer. At the receiver station is an adjustable resistance or potentiometer. In general, the transmitter secondary windings and the receiver potentiometer are included in a bridge or balanceable network. The magnetic coupling between the transmitter primary and secondary windings varies in accordance with changes in the independent variable, and hence the voltage induced in the transmitter and secondary winding or windings will be proportional to the magnitude of the independent variable. The proportioning of the receiver potentiometer resistance between portions of the bridge circuit is varied in correspondence with changes in the dependent variable. In the present embodiment being described, the dependent variable is the position of the exhibiting means, and hence the voltage relation of the receiver resistance portions will be proportional to the magnitude of the dependent variable.

The structure characterizing the present invention is found in the resistances which shunt the secondary coils or windings of the transmitter. The connection between these two shunting resistances is brought, through a third resistance, to the connection joining the secondary windings or coils. The resistances shunting the output of the movable core transformer, and supplied thereby, may then be regarded as the adjacent legs of the bridge formed with the potentiometer at the receiver.

Fig. 1 illustrates a transmitting station 1 and a receiving station 2. Core piece 3 of the transmitter is shown diagrammatically, and is to be regarded as positionable by any variable, such as fluid rate of flow, temperature, pressure, or merely with the position of an object. The object of the system is to telemetrically transmit the position of the core piece 3 to the receiver location 2 which may be adjacent or remote from the location of the member 3. Preferably the value of the variable, as represented by the position of the core piece 3, is continuously indicated by a marking device 4 relative to an index scale 5 and a rotatable chart 6. The member 4 is positioned by a motor 7.

Transmitter 1 employs a 3-coil movable core transformer. The receiver 2 employs a potentiometer or resistance winding 15 divided into two portions by a movable contact arm 8. The arm 8 is positioned by the motor 7 for rebalancing the bridge circuit.

The system is generally arranged so that when zero potential exists between the terminals 9 and 10, the position of the core piece 3 may be said to correspond with that of the contact arm 8. However, a change in position of the core piece 3 will, if in one direction, cause a voltage of one phase to exist between the terminals 9 and 10 and of the opposite phase if the core piece 3 changes position in opposite direction. The voltage caused to appear between the terminals 9 and 10 is, through suitable amplifying and relay means, used to selectively operate the motor 7 in one direction or the other in accordance with the phase of the voltage. The direction of operation of the motor 7 is such that the contact arm 8 is moved toward correspondence with the position of the core 3, and when such correspondence is obtained the potential between the terminals 9 and 10 is zero.

Assume, for example, that at some value of the variable being transmitted the voltage induced in the secondary winding 11 is equal to that induced in the secondary winding 12. Then upon an increase in the value of the variable from the assumed value the voltage induced in the winding 11 will be greater than that induced in the winding 12. This will cause a voltage of predetermined phase to exist between the terminals 9 and 10. Assuming on the other hand, a decrease in the variable from the assumed value, a voltage of opposite phase will exist between the terminals 9 and 10. Under the first condition the motor 7 is caused to operate in a first direction to move contact 8 to proportion the resistance 15 until the voltage induced in the winding 11 is again equal to that induced in the winding 12. Under the second condition the motor 7 is caused to operate in opposite direction until the voltage induced in the windings is again equal. The position of the motor 7, and any of the elements positioned thereby, thus becomes a measure of the variable which is physically positioning the core piece 3.

The voltage caused to appear across the terminals 9 and 10 is amplified by means of a multi-stage electronic amplifier and applied by a motor control circuit, all included in device 13. The output of the device 13 is utilized to selectively control the rotation of motor 7. These amplifier-motor control-motor combinations are common in the art as illustrated by at least my Patent 2,544,790, issued March 13, 1951.

The transmitter 1 includes an alternating current energized primary winding 14 magnetically coupled by the core piece 3 to the secondary windings 11 and 12. The voltages $E_1$ and $E_2$ established across the secondary windings and across resistances $R_2$ and $R_3$ are basically generated from primary 14 and that across $R_1$ is a resultant therefrom. The bridge circuit or balanceable electric network may then be considered as formed by these resistances $R_2$, $R_3$, the potentiometer resistance 15, fixed resistances A and B, as well as the amplifier-motor control circuit 13. Voltage $E_2'$ is taken as appearing across $R_2$ and $E_1'$ across $R_3$. Slidewire 15 is combined with contact 8 to form the potentiometer adjusted by motor 7. A and B are fixed resistances for calibration adjustment of the balanceable electric network.

The ratio $E_2'/E_1'$ is a function only of the position of the magnetic core 3 and is not affected by the magnitude, frequency or phase of the exciting voltage applied to the primary winding 14. The accuracy of positioning is practically independent of phase shift of the exciting voltage applied to primary 14. It is for this reason that ambient temperature changes of the windings of the movable core transformer, as well as line resistance, have negligible effect on the balance of receiver 2.

It is, of course, appreciated that the bridge including the resistances $R_2$ and $R_3$, as well as resistances A, B and 15 is not a conventional bridge to which a source of power is directly applied. The power supply for the network is obtained through the magnetic coupling of core piece 3 between the primary winding 14 and the secondary windings 11 and 12. The induced voltages have been represented as $E_1$ and $E_2$ and are functions of core 3. Voltages $E_1$ and $E_2$ establish the voltages $E_1'$ and $E_2'$ across resistances $R_2$ and $R_3$. If the position of the core 3 is changed by change in the value of the variable represented by the position of the core 3, then the ratio of $E_2'/E_1'$ is varied and a potential is established in the conjugate conductor across terminals 9 and 10 whose magnitude is representative of the magnitude of the change in position of the core 3, while the phase of the potential in the conjugate conductors 9 and 10 is representative of the sense of change in position of the core piece 3.

The amplifier 13 is sensitive and responsive to the phase of the potential across terminals 9 and 10 controlling the rotation of the motor 7 in a direction corresponding to said phase. The motor 7 is mechanically or otherwise connected to position the contact arm 8 by the necessary gear or motion reduction which has been indicated in Fig. 1 merely diagrammatically as a dotted line. When the core 3 is moved in one direction, thereby changing the ratio $E_2'/E_1'$ in given sense, the resulting phase condition across terminals 9 and 10 causes a positioning of the motor 7 and correspondingly of the contact arm 8 to vary the ratio $E_2'/E_1'$ in proper direction and amount to rebalance the bridge and bring the potential across the terminals 9 and 10 to a null condition of both potential and phase. Thereupon the position of the contact 8 and of indicating pointer-pen 4 is representative of the position of the core 3. In this manner the motor 7 indicates the value of the variable which has caused the positioning of the core 3 and at the same time returns the bridge to a null or steady state condition.

The purpose of this circuit is to extend the range of measurement of the movable core transformer core travel. By employing this circuit, the receivers are calibrated for a standard range and measure core travel ranges up to several times the standard range, limited only by the characteristics of the movable core transformer.

The present invention proposes that the value of resistance element $R_1$ be varied to provide the calibration adjustment. The resistance values of elements $R_2$ and $R_3$ will remain at a fixed value which is determined by allowable coil loading on the secondary windings 11 and 12.

In making a circuit analysis, it is initially noted that output voltage $E_1$ of secondary winding 12 appears across resistances $R_1$ and $R_2$ and causes instantaneous current flow $I_1$. A voltage $E_2$ of winding 11 is applied to resistances $R_1$ and $R_2$ to produce instantaneous current flow $I_2$. These two currents, flowing through resistances $R_2$ and $R_3$ product voltage drops $E_1'$ and $E_2'$ respectively. When the core is in the electrical center of the movable core transformer, voltage $E_1$ equals $E_2$, $I_1$ and $I_2$ are equal and opposite and there is no current flow through $R_1$, thus $E_1$ equals $E_1'$ and $E_2$ equals $E_2'$.

Movement of core 3 away from the electrical center causes an unbalance in voltages $E_1$ and $E_2$, resulting in a current flow through resistance $R_1$. The phase of the voltage drop across $R_1$ will be that of the larger secondary voltage and is represented by $IR_1$, where I is the net current through $R_1$. Thus, assuming the core to move upward from the center in Fig. 1, $E_2$ will become larger than $E_1$ and the voltage drop across $R_1$ will be in phase with $E_2$. Arrows of the drawing show the current flow direction for one half cycle of supply voltage to primary 14. According to Kirchoff's Laws, $E_2' = E_2 - IR_1$. Taking the connection between windings 11 and 12 as a reference point, the voltage drop across $R_1$ adds to $E_1$ so that $E_1' = E_1 + IR_1$. If the core moves downward from the electrical center, the voltage drop across $R_1$ will be in phase with $E_1$.

Taking the desired standard core stroke as being ¼", this circuit may be analyzed as capable of changing the ratio of the movable core transformer secondary voltages for core strokes exceeding ¼" to the equivalent ratio established when the receiver was calibrated to the standard ¼" core travel. This function is mathematically expressed; substituting for I the equivalent relationships of voltages and resistances, and where $R_3 = R_2$ as:

$$\frac{E_2'}{E_1'} = \frac{E_2(R_1+R_2)+E_1R_1}{E_1(R_1+R_2)+E_2R_1}$$

As an example of a specific reduction to practice it was found, for ¼" core travel of the movable core transformer, that:

$$E_1 = 11.6 \text{ volts}$$

$$E_2 = 17.9 \text{ volts}$$

$$\frac{E_2}{E_1} = \frac{17.9}{11.6} = 1.54 \text{ voltage ratio}$$

Now, if it is desired to use 3/10" core travel of the above movable core transformer the formula may be used to determine the value of $R_1$, with predetermined values of 3000 ohms for $R_2$ and $E_1 = 11.0$ v.; $E_2 = 18.6$ v. being observed.

$$\frac{E_2'}{E_1'} = 1.54 = \frac{18.6(R_1+3000)+11.0R_1}{11.0(R_1+3000)+18.6R_1}$$

$$R_1 = 310 \text{ ohms}$$

Figure 2:
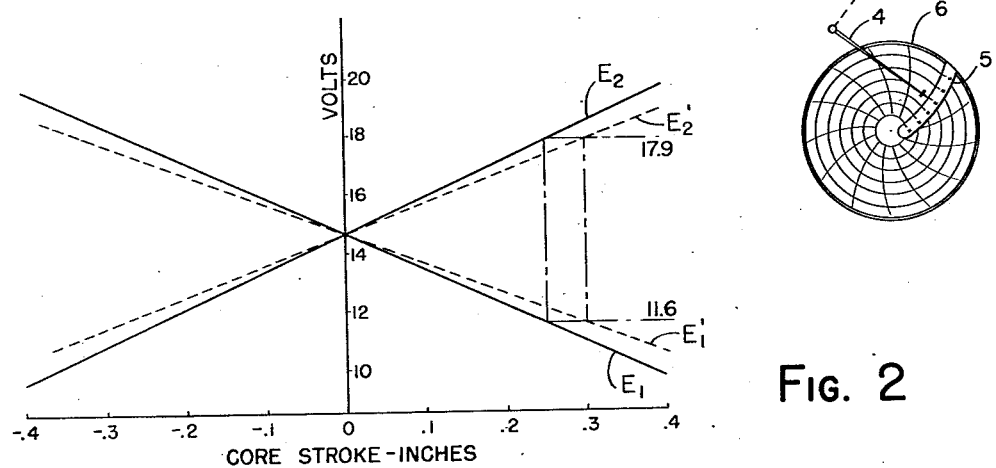
Fig. 2 is a graphical representation of the ratio of voltages established as an output of the movable core transformer with respect to its core movement.

In Fig. 2, the mathematically expressed relationships have been plotted graphically. The individual voltage outputs $E_1$ and $E_2$ have been plotted against core stroke in either direction from the electrical center. In the well designed movable core transformer these voltages are linear, at least over the desired ranges.

$E_1$, at a ¼" stroke, may be observed as 11.6 volts. $E_2$, at a ¼" stroke, may be observed as 17.9 volts. Assuming the limitation of a core stroke of 3/10", an $R_1$ value has been calculated by the foregoing mathematical method and the resulting variation of $E_1'$ and $E_2'$ is clearly demonstrated as producing the same outputs as when the ¼" stroke was utilized. Thus the ratio of the voltages unbalancing the bridge with the potentiometer at receiver 2 is maintained the same along uniform percentages of receiver movement from 0 to 100%.

Figure 3:
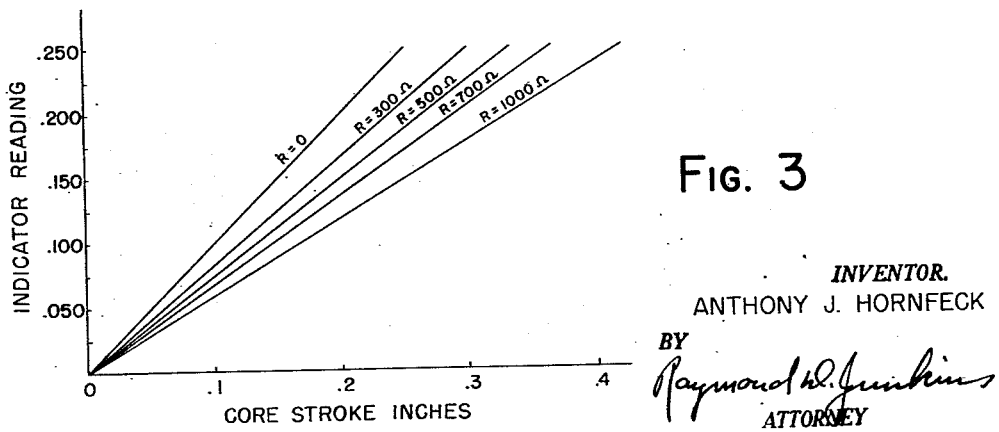
Fig. 3 is a graphical representation of how ranges of indication of various embodiments of the invention may be standardized for the core movements by changing the value of the resistance network in combination with the system.

Fig. 3 has been utilized to plot a series of receiver movements against core position variation, using different values for $R_1$. It is necessary that this variation be linear over the range of receiver movement and these graphs, taken from actual data, establish that this result is achieved.

Figure 4:
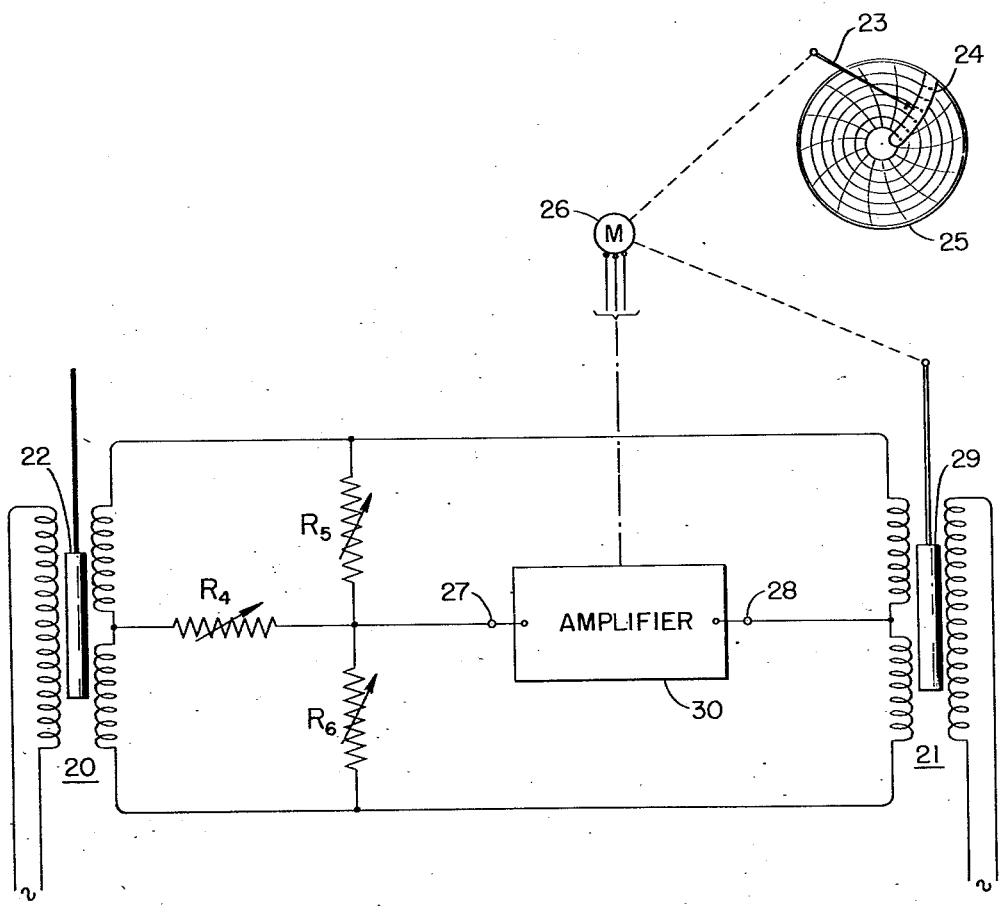
Fig. 4 illustrates my invention embodied in a coil-coil balancing system.

Fig. 4 is another embodiment of my invention utilizing a telemetric balancing system having a first movable core transformer at the transmitter and a second movable core transformer at the receiver. This system is generally disclosed in at least Dickey 2,629,552, issued February 24, 1953.

As in Fig. 1, the transmitting station 20 is shown diagrammatically and is to be regarded as positionable by any variable in order to transmit the value of the variable to receiving station 21. Specifically, the value of the variable as represented by the position of core 22 is continuously indicated by a marking device 23 relative to an index scale 24 and a rotatable chart 25. The pen 23 is positioned by a motor 26.

Both transmitter 20 and receiver 21 employ movable core transformers. As in Fig. 1, the system is generally arranged so that when zero potential exists between the terminals 27 and 28, the position of core 22 may be said to correspond with that of core 29. However, a change in position of core 22 will, if in one direction, cause a voltage of one phase to exist between the terminals 27 and 28 and of the opposite phase when core piece 22 changes position in opposite direction. The voltage appearing between terminals 27 and 28 is, by means of amplifying and control circuits 30, used to selectively operate motor 26 in one direction or the other in accordance with the phase of the voltage. The direction of operation of the motor 26 is such that the core 29 is moved toward correspondence with the position of core 22 to reduce the voltage between terminals 27 and 28 to zero.

The relationship of the voltages across the pairs of secondary windings at transmitting station 20 and receiving station 21 is the same as the relationship between the secondary voltages of transmitting station 1 and those dropped across the divided potentiometer resistance 15. Therefore, the present invention is formed with this circuit of Fig. 4 by combining a resistance network with transmitting station 20 similar to that formed with transmitting station 1 and $R_1$, $R_2$ and $R_3$. Specifically, $R_4$, $R_5$ and $R_6$ are utilized to achieve the same objects. Note, however, that all of these resistances of Fig. 4 are depicted as adjustable. This is to illustrate that not only these, but the comparable resistances of Fig. 1, can be utilized in adjustable form to conveniently obtain their desired values.

The analysis of voltages appearing across the secondaries of transmitting station 20, the resistances of the network $R_4$—$R_5$—$R_6$ and the secondaries of receiving station 21 parallels that made in connection with Fig. 1. The purpose of this T circuit is to extend the range of measurement of the movable core transformer of transmitting station 20. By employment of the circuit including $R_4$, $R_5$ and $R_6$ the receiving station 21 may be calibrated for an arbitrarily selected standard range which can be matched with core travels of transmitting station 20 up to several times the standard range, limited only by the characteristics of the movable core transformer.

The present invention proposes that the value of resistance $R_4$ be varied to provide the adjustment of the core travel of transmitting station 20 to that of receiving station 21. The values of resistances $R_5$ and $R_6$ are determined by allowable coil loading on the secondary windings of transmitting station 20.

The invention now may be thoroughly appreciated in its contribution to measuring systems employing those of the balanceable networks of Figs. 1 and 4. Structure of the invention provides a single resistance value which can be predetermined to accommodate a wide variety of transmitters with various core stroke ranges. All of the core stroke ranges are reduced to a common denominator of receiver movement, greatly advancing the standardization desired in production.

What I claim as new, and desire to secure by Letters Patent of the United States, is:

1. A balanceable electric network including, a movable core transformer with a pair of similar secondaries, a potentiometer with its resistance spanning both secondaries as a single winding, a first resistance element connected by one end to the common connection of the secondaries, a second and third resistance element each shunting a secondary and making a common connection with the first resistance, means sensitive to unbalance of the network and connected between the common connection of the resistances and the potentiometer contact, and motive means responsive to the sensitive means for simultaneously positioning the potentiometer contact and an exhibiting means.

2. Balanceable electric network including, a first portion of the network including a movable core transformer with a pair of secondary windings connected to each other by one of their ends establishing a ratio of its secondary voltages within a predetermined range, a second portion of the network adjustable to establish predetermined ranges of voltages, means adjusting the movable core transformer of the first portion in accordance with the variable, a third portion of the network which establishes the predetermined range of the ratio of the secondary voltages of the first portion in accordance with the movement of the means adjusting the first portion and includes a first resistance element connected by one end of the common secondary connection and a second and third resistance element each shunting a secondary and making a common connection with the first resistance, sensitive means comparing the voltages of the first and second portions, and motive means directionally controlled by the sensitive means to adjust the second portion to balance the network.

References Cited in the file of this patent
UNITED STATES PATENTS
2,611,812    Hornfeck _____ Sept. 23, 1952